United States Patent
Leung et al.

[11] Patent Number: 5,881,219
[45] Date of Patent: Mar. 9, 1999

[54] RANDOM RELIABILITY ENGINE FOR TESTING DISTRIBUTED ENVIRONMENTS

[75] Inventors: Theodore Wei-Yun Leung, Cupertino; Shoba Raj, San Jose, both of Calif.

[73] Assignee: International Business Machines Corporation, Armonk, N.Y.

[21] Appl. No.: 774,008

[22] Filed: Dec. 26, 1996

[51] Int. Cl.⁶ .................................................. G06F 11/00
[52] U.S. Cl. ................. 395/183.07; 395/184.01
[58] Field of Search ............... 395/183.01, 183.03, 395/183.14, 180, 183.13, 183.17, 184.01, 187.01, 183.02

[56] References Cited

U.S. PATENT DOCUMENTS

| | | | |
|---|---|---|---|
| 4,797,885 | 1/1989 | Orimo et al. | 395/183.14 |
| 4,953,096 | 8/1990 | Wachi et al. | 395/183.14 |
| 5,371,883 | 12/1994 | Gross et al. | 395/183.14 |
| 5,548,718 | 8/1996 | Siegel et al. | 395/183.14 |
| 5,596,714 | 1/1997 | Connell | 395/183.14 |
| 5,613,079 | 3/1997 | Debique et al. | 395/183.14 |
| 5,613,098 | 3/1997 | Landeau et al. | 395/183.14 |
| 5,615,333 | 3/1997 | Juettner et al. | 395/183.14 |
| 5,640,537 | 6/1997 | Jessen et al. | 395/329 |
| 5,669,000 | 9/1997 | Jessen et al. | 395/704 |
| 5,680,584 | 10/1997 | Herdeg et al. | 395/183.14 |
| 5,692,122 | 11/1997 | Bird | 395/183.14 |
| 5,708,774 | 1/1998 | Boden | 395/183.14 |

FOREIGN PATENT DOCUMENTS 0 730 227 A1  9/1996  European Pat. Off. .

OTHER PUBLICATIONS

Berst, Jesse, Internet article: "Product Info: QA Partner 3.0", ZD AnchorDesk, Ziff–Davis Inc., 1996 (entire document), http://www4.zdnet.com/anchordesk/products/products 1325.html.

Ballou, Melinda–Carol, Internet article: "Client/server testing booms", Computerworld, Inc., Jul. 25, 1994 (entire document), http://www.computerworld.com/search/AT–html/9407/940725SL29testyo.html.

Primary Examiner—Albert DeCady
Attorney, Agent, or Firm—Merchant, Gould, Smith, Edell, Welter, & Schmidt

[57] ABSTRACT

A method, apparatus, and article of manufacture for a computer-implemented random reliability engine for testing distributed computer environments. The random reliability engine performs reliability testing of applications in a distributed environment. The random reliability engine simulates a user who is invoking various commands in various documents that are open in the distributed environment. The random reliability engine is a random rule based engine that generates random sequences of commands on documents. The random reliability engine generates these sequences for a fixed amount of time. When these sequences are successfully executed within the fixed amount of time, the random reliability engine determines that the distributed environment is reliable. Moreover, the random reliability engine can be implemented as a graphical user interface test script that is executed by a graphical user interface driver.

42 Claims, 6 Drawing Sheets

$ cat EditableTextRules

410 — NotOpen: OpenDocument: IsOpen -NotOpen: 5: OpenSuccessful;

420 — IsOpen : CloseDocument: -IsOpen +NotOpen: 5: CloseSuccessful;

:EnterText: +HasText: 2: TextEntrySuccessful ;

HasText :MarkRegion 0 0 100 50: +HasSelection: :WasSelectionSuccessful

HasSelection : Menu "Edit" "Cut" : 1: -HasSelection +HasClipboard :1: WasCutSuccess;

HasSelection : Menu "Character Styles" "Font" "Chicago" :: 1: WasChangeSuccess;

GlobalHasClipboard:Menu "Edit" "Paste": -GlobalHasClipboard:1: WasGlobalPasteSuccess;

FIG. 4

RANDOM RELIABILITY ENGINE FOR TESTING DISTRIBUTED ENVIRONMENTS

BACKGROUND OF THE INVENTION

1. Field of the Invention

This invention relates in general to computer implemented random reliability engines, and in particular to a random reliability engine for executing test cases created using a graphical user interface (GUI) driver to test a distributed environment.

2. Description of Related Art

Increasingly, users are working in distributed computer environments. In some distributed computer environments, users at different computers that are connected by a network are able to share applications. In the following example, two computers are connected to each other by a network. A user at one of the computers invokes a word processing application. The output of the word processing application is displayed on the display device of each connected computer. The users at each connected computer can provide input to the word processing application and view the output of the word processing application at that computer, thereby sharing the application.

Typically, unit tests are performed to test parts of a computer environment. However, these unit tests are not adequate for testing distributed computer environments. Currently, there is a need for methods of testing distributed computer environments.

Object oriented programming (OOP) is increasingly used to develop complex applications. OOP is a process of developing computer software using objects. An object is a software package that contains both data and a collection of related structures and procedures. An object is a single instance of a class of objects. A class of objects can be viewed as a blueprint, from which many objects can be formed. OOP allows creation of an object that "depends from" another object. The object that depends from another object inherits all of the aspects of that object. The inherited characteristics can be overridden. Also, the object that depends from another object may have the same underlying functions associated with them, but these functions may have different implementations.

As OOP moves toward the mainstream of software design and development, methods of testing distributed environments should be adapted to make use of the benefits of OOP. A need exists for these principles of OOP to be applied to testing distributed environments such that a set of OOP classes and objects for testing distributed environments can be provided.

Additionally, frameworks are being increasingly used. A framework is a generic application that displays user interface elements, such as windows and dialog boxes, and that supports various functions, such as copy and paste. The framework code provides event handling and flow of control. Moreover, a framework is typically a collection of cooperating classes that make up a reusable design solution for a given problem domain. The programmer uses a framework by inheriting the default behavior of the framework and overriding some of the behavior so that the framework calls application code, which is written by the programmer, at appropriate times (e.g., when a proprietary data structure is to be created or manipulated).

Incorporation of the principles of OOP and frameworks in a testing system for testing distributed environments allows the testing system to be more tightly integrated with other OOP-based applications and operating systems. In addition, the maintenance and development effort required by such an OOP-based testing systems will likely be significantly less than complex procedural programming-based testing systems. This is because parts (i.e., objects or classes) of the OOP-based testing system may be modified as needed and automatically propagated throughout the software code without affecting the rest of the testing system. In contrast, an entire procedural programming-based testing system, as conventionally produced, must be completely tested and debugged each time any modification is made to the software code, because each modification must be manually propagated to different parts of the software code. Therefore, there is a need for a method of testing distributed environments that incorporates the principles of OOP and frameworks.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented random reliability engine for testing distributed computer environments.

In accordance with the present invention, the random reliability engine provides a method of performing reliability testing of applications in a distributed environment. The random reliability engine simulates a user who is invoking various commands on user data. The random reliability engine is a rule based engine that generates random sequences of commands on the user data. The random reliability engine generates these sequences for a fixed amount of time. When these sequences are successfully executed within the fixed amount of time, the random reliability engine determines that the distributed environment is reliable. Moreover, the random reliability engine can be implemented as a graphical user interface test script that is executed by a graphical user interface driver.

BRIEF DESCRIPTION OF THE DRAWINGS

FIG. 4 illustrates a DocumentRulesFile containing rules executed by the random reliability engine.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Distributed Environment

Figure 1:
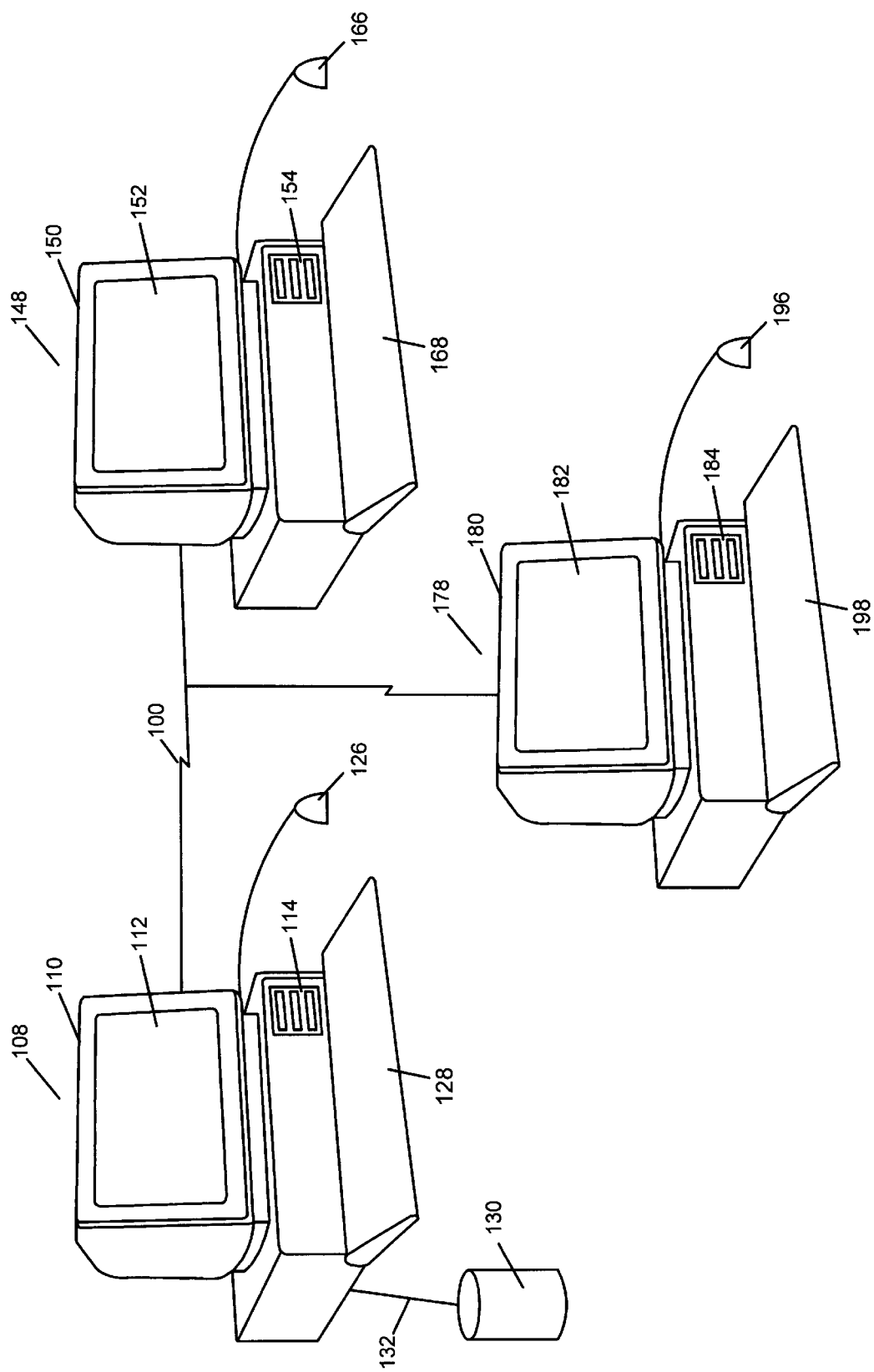
FIG. 1 is a block diagram of an exemplary hardware environment of the preferred embodiment of the present invention.

FIG. 1 is an exemplary hardware environment used to implement the preferred embodiment of the present invention. The present invention is typically implemented using personal computers or workstations and servers 108, 148, 178 in a distributed environment. Each computer 108, 148, 178 generally includes, inter alia, a processor, random access memory (RAM), read only memory (ROM), a video card, bus interface, and/or other components. It is envisioned that attached to each computer 108, 148, 178 may be a monitor 110, 150, 180 (e.g., a CRT, an LCD display, or other display device) and data storage devices 114, 164, 184, such as hard disk, floppy, and/or CD-ROM disk drives. Also included in the preferred embodiment may be input devices, for example, a mouse pointing device 126, 166, 196 and a keyboard 128, 168, 198.

Those skilled in the art will recognize that any combination of the above components, or any number of different components, peripherals, and other devices, may be used with the computers 108, 148, 178. For instance, although FIG. 1 illustrates three computers 108, 148, 178, the present invention can be practiced with two computers or more than three computers connected by a network.

The computers 108, 148, 178 operate under the control of an operating system, such as AIX, Windows NT, IBM OS/2®, UNIX, or Apple System/7®, which is represented in FIG. 1 by the screen displays 112, 152, 182 on the monitors 110, 150, 180. Moreover, each computer has resident thereon, for example, in a data storage device 114, 154, 184, various applications embodying the present invention. However, it should be understood that, in the alternative, the principles of the invention may also be implemented within the operating system 112, 152, 182.

In the distributed environment illustrated in FIG. 1, multiple computers 108, 148, 178 are connected by a network 100. One of the computers is designated to control the sharing of the applications at these computers. This designated computer is called a master computer, and each other computer is called a slave computer. For example, for the purposes of explanation in this application, computer 108 will be designated the master computer and computers 148, 178 will be designated the slave computers. The master computer is connected to a database 130 via a bus 132.

Generally, the computer programs which implement the preferred embodiment of the invention are tangibly embodied in a computer-readable medium or carrier, e.g., one or more of the fixed and/or removable data storage devices 114, 154, 184. Under control of operating systems 112, 152, 182 the computer programs may be loaded from the data storage devices 124, 154, 184 into the memories of the computers 108, 148, 178. The computer programs comprise instructions which, when read and executed by computers 108, 148, 178 cause the computers 108, 148, 178 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
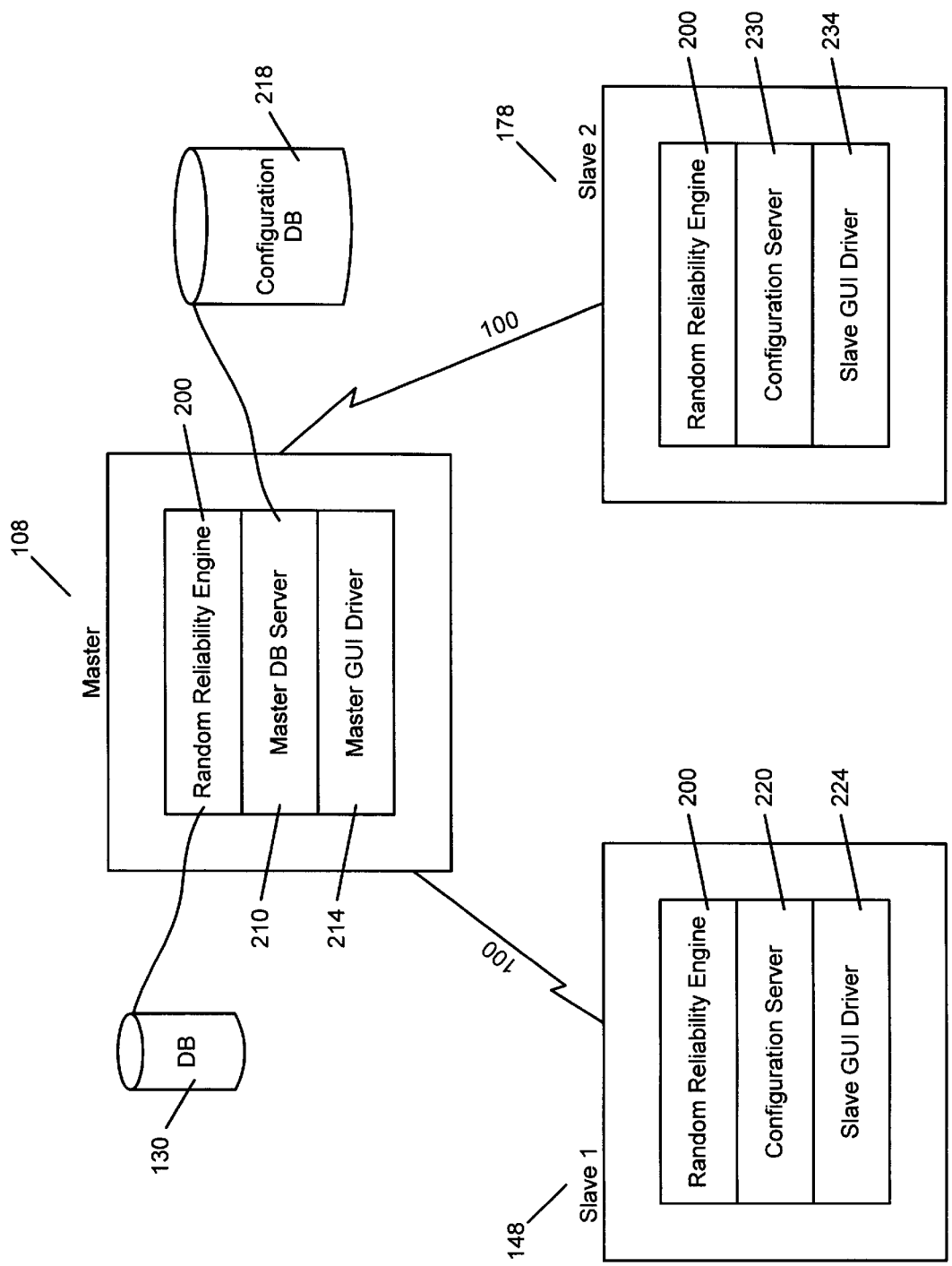
FIG. 2 illustrates the applications embodying the present invention.

FIG. 2 illustrates some of the applications embodying the present invention. The random reliability engine 200 provides a method of performing reliability testing in a distributed environment. The random reliability engine stores its data and files in the random reliability engine database (DB) 130.

In the distributed environment, multiple users at the computers 108, 148, 178 can simultaneously provide input to and view the output of applications (e.g., framework applications). The data associated with each framework application is said to be stored in a structure called a document. A document is an object that contains and provides access to data. The terms "framework application" and "document" can be used interchangeably. Users at each of the computers 108, 148, 178 can enter commands that operate on the data in the document. The random reliability engine 200 simulates users who are invoking various commands on various documents that are open in a distributed environment. The random reliability engine 200 executes these commands at each computer 108, 148, and 178.

In one embodiment of the present invention, the random reliability engine 200 is a graphical user interface (GUI) test script that is executed by a graphical user interface (GUI) driver. A copy of the GUI driver resides at each computer. In particular, a master GUI driver 214 resides at the master computer 108, and a slave GUI driver 224, 234 resides at each slave computer 148, 178. The master GUI driver 214 executes commands of the random reliability engine 200 and simultaneously forwards these commands to the slave GUI drivers 224, 234 for execution of the commands at the slave computers 148, 178. The slave GUI drivers 224, 234 report the results of the execution of the commands to the master GUI driver 214, which determines the reliability of the distributed environment.

The master computer 108 has a master database (DB) server 210 that maintains configuration information about each computer in the network. The configuration information is stored in a configuration database (DB) 218. Each slave computer 148, 178 has a configuration server 220, 230. At the startup of a computer, the configuration servers 220, 230 at the slave computers 148, 178 forward identification information identifying the computers to the master DB server 210. The master DB server 210 then requests configuration information from the configuration servers 220, 230 at the slave computers 148, 178.

In order to test a distributed environment in which the random reliability engine 200 is a GUI driver test script, a user invokes the master GUI driver 214, which executes the random reliability engine 200 to perform the testing of the distributed environment. In particular, the random reliability engine 200 identifies the configuration requirements of computers needed for the test. The master GUI driver 214 obtains these computers using configuration information in the configuration DB 218. Then, the master GUI driver 214 executes the commands of the random reliability engine 200 at the master computer 108 and simultaneously signals the slave GUI drivers 224, 234 to execute these commands at the slave computers 148, 178. The slave GUI drivers 224, 234 return the results of execution to the master GUI driver 214, which determines the reliability of the distributed environment.

Random Reliability Engine

Overview

The random reliability engine 200 will improve the stability, reliability and the quality of a distributed environment by uncovering and reporting unexpected problems. The random reliability engine 200 executes commands randomly within a document. This simulates users interacting with computers in a distributed environment. The random reliability engine 200 also jumps between documents randomly in order to check the stability of the distributed environment. This reflects a natural usage pattern.

The random reliability engine 200 is robust with respect to individual command failures. In particular, the random reliability engine 200 measures the amount of time that the test runs in order to determine the reliability of a distributed environment. That is, the random reliability engine 200 runs the reliability test for a user specified duration, reporting the number of errors that occurred.

The random reliability engine 200 incorporates document-independent commands (commands that apply to every document, such as window moving). The random reliability engine 200 also generates and executes commands that span documents, such as copy and paste or drag and drop between documents. Moreover, the random reliability engine 200 provides a way to incorporate document-specific commands that are unique to a particular document. This creates a more realistic test by allowing document-specific behavior to be part of the randomly generated sequences.

The random reliability engine 200 provides a way to access the randomly generated commands. This option provides the ability to replay and reproduce failed scenarios. The random reliability engine 200 has the ability to test a reasonable subset of the commands provided for a document. This provides an opportunity to test the behavior of the distributed environment with different sets of commands. Additionally, the random reliability engine 200 supports a process that facilitates testing new parts of the distributed environment by using newly provided documents.

The random reliability engine 200 generates a report which has information about the rule/command success rate and produces a text file that contains standard output and standard error messages for analysis purposes. The text file also identifies the amount of time in which the test was executed.

The random reliability engine 200 accepts the number of documents to be tested as input. This provides an opportunity to test the behavior of the distributed environment with different numbers of documents and also with different types of documents. The random reliability engine 200 runs commands that make sense given the state of the distributed environment. For example, commands affecting the clipboard are generated when there is data on the clipboard or data that can be moved to the clipboard. The random reliability engine 200 also enables commands to exercise common user interface (UI) elements such as menus, window controls, and dialog boxes, regardless of their location on the screen.

Random Reliability Engine Database

Figure 3:
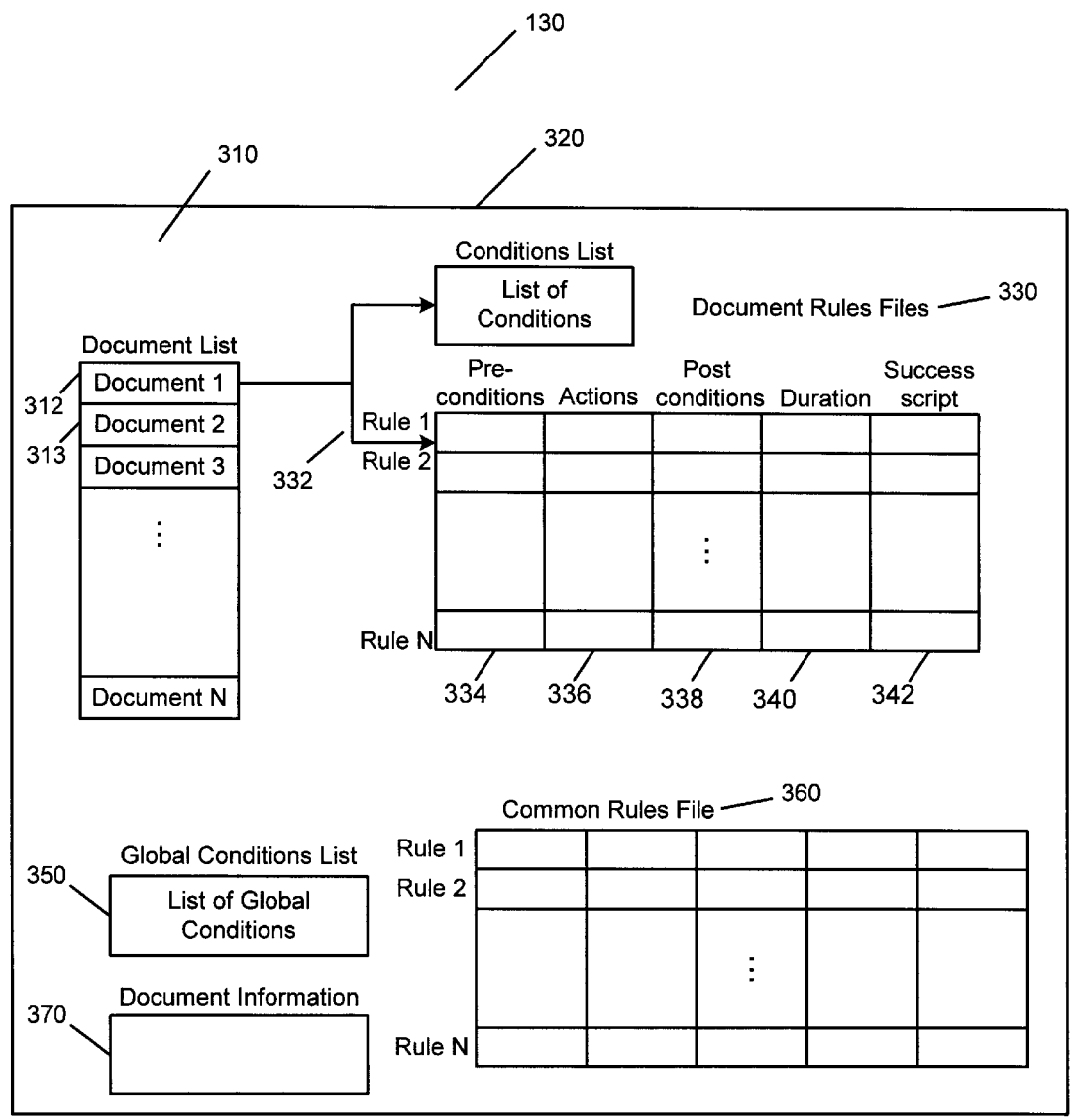
FIG. 3 illustrates the internal architecture of the random reliability engine database.

FIG. 3 illustrates the internal architecture of the random reliability engine DB 130. The random reliability engine 200 is a rule-based engine. In particular, the random reliability engine 200 invokes actions (i.e., commands) specified by rules. The actions are performed on data in documents. The random reliability engine DB 130 contains a document list 310 containing one or more documents, such as document 312. The document 312 identifies a list of conditions 320 specifying the current conditions of the distributed environment. The document 312 also identifies a file, called DocumentRulesFile 330, that defines a set of rules which the random reliability engine 200 uses to execute document commands. The DocumentRulesFile 330 contains one or more rules, such as rule 332. The rule 332 has five parameters: preconditions 334, actions 336, post-conditions 338, duration 340, and success script 342.

Each document 312 has at least one rule 332 for each command that can be generated by the random reliability engine 200. This command is called the action 336 of the rule and is specified by giving one or more GUI driver test script commands (a library of useful commands is provided in a RandomUtilityFuncs file).

Many commands require some kind of preparation before they can be executed. For example, a cut or copy command only makes sense if the document contains a selection. Each document 312 that is participating in a random reliability test has a list of conditions 320 associated with it. These conditions 320 reflect facts about the current state of the document 312, for example, that the document 312 has a selection or that the document 312 contains some text. The presence of a condition 320 in the list means that the condition 320 is true, absence implies that the condition 320 is false. To ensure that commands are only executed when the proper setup has occurred, a rule 332 specifies a set of preconditions 334, which must all be true in order for the rule 332 to execute.

After the action 336 has been executed, it is possible for new conditions 320 to be true about the document 312 or for old conditions 320 to now be false. A set of post-conditions 338 allows a rule writer to add new conditions 320 and remove old ones from the list of conditions 320. Conditions 320, preconditions 334, and post-conditions 338 are all specified as test control language (TCL) strings.

Moreover, in some situations rule writers would like to be able to write rules for commands that span documents. Examples of these commands include cut and paste, or drag and drop between documents. In order to facilitate writing these rules, the random reliability engine 200 allows some conditions 350 to be global to all documents. The global conditions 350 begin with the prefix Global. This allows one document 312 to put something on the clipboard and another document 313 to paste that information.

The random reliability engine 200 detects when failures occur in the distributed environment. The random reliability engine 200 allows the rule writer to specify a success script 342, which is a GUI driver test script, that is executed to test for the successful completion of the actions 336 in the rule 332. This check for completion occurs after a user specified duration 340 that allows slow actions 336 to complete. When actions 336 complete within the duration 340, the random reliability engine determines that the test was successful.

Some commands are available on all documents. These commands include window movement, window resizing, and printing. In order to reduce the work of writing rules, a common rules file 360 is provided. Any rule which resides in the common rules file 360 is considered a part of the rule set of every document 312. The name of the common rules file is CommonRules. This file follows the same format for rules as the DocumentRulesFile 330.

All DocumentRulesFiles reside under $Root/Tests/Reliability/RandomTest/Scripts. Each rule has 5 components.

The following is the notation convention for rules:

{ }→means 0 or more

[ ]→means 0 or one

< >→means variable name ( )→means optional

The following provides the format of a rule:

{precondition(s)}:Action {|Action }: {post-conditions(s)}:
 {n}:success script

The preconditions parameter specifies zero or more preconditions 334. The action parameter specifies one or more actions 336 that are performed if there are no preconditions 334 or if all of the preconditions 334 are true. Each action 336 is a GUI driver test script. These actions 336 are executed sequentially. Multiple actions 336 are separated by a vertical bar (i.e., |). Many actions 336 are defined in the file RandomUtilityFuncs, which can be utilized to write actions 336. The post-conditions parameter specifies zero or more post-conditions 338. Each post-condition 338 string is prefixed with a "+" sign to add the post-condition 338 and a "−" sign to remove the post-condition 338. The current conditions are modified based on the post-conditions 338 only if the action 336 is successful. The "n" parameter specifies duration, and the success script parameter specifies a GUI driver test script. The success of the action 336 is determined by the success script 342 and duration 340. The duration 340 is an integer and specifies seconds. If the duration is not specified, the default duration is five seconds. The success script 342 returns true if the action 336 executed successfully, and false otherwise.

The following examples illustrate rules:

EXAMPLE 1

```
HasSelection:Menu Edit Cut: -HasSelection: 1:
CutSuccessful;
HasSelection    : One precondition
:               : Component separator
Menu Edit Cut   : Single action, Menu is a function
                  from RandomUtilityFuncs
-HasSelection   : Post-condition is deleted if
                  CutSuccessful is true
1               : duration to execute the cut action is
                  one second
CutSuccessful   : returns true if Cut action has been
                  executed successfully
;               : End of statement
```

EXAMPLE 2

```
GlobalHasClipboard :MoveInDoc 50 50 | Menu Edit Paste :
-GlobalHasClipboard    : 1: PasteSuccessful ;
GlobalHasClipboard     : One global precondition
:                      : Component separator
MoveInDoc 50 50
|Menu Edit Paste       : Two actions separated by a
                         vertical bar. These two actions
                         are functions of
                         RandomUtilityFuncs
-GlobalHasClipboard    : Global post-condition is deleted
                         if PasteSuccessful is true
1                      : duration to execute the command
                         cut is given one second
PasteSuccessful        : returns true if paste action has
                         been executed successfully
;                      : End of statement
```

FIG. 4 illustrates a DocumentRulesFile 330. The DocumentRulesFile 330 displayed is EditableTextRules, which contains rules for EditableText. The file CommonRules also follows the same format and is common to all documents.

The random reliability engine DB 130 also includes a DocumentInformation file 370 that contains information on each document participating in the test. The DocumentInformation file 370 can have information on one or more documents. Document information for a document in the DocumentInformation file 370 has the following format:

<DocumentRulesFile> DocumentName [Stationery Library];

The DocumentRulesFile parameter is the name of the file which has the set of rules for a document. The Document-Name parameter is the name of the document. The Stationary and Library parameters are specified when creating a document to describe the location of the document. The Stationery parameter is an optional parameter, and it is the name of the stationery from which the document is to be created. The Library parameter is the name of the library and is required if stationary is used. A semi-colon (i.e., ;) ends the statement.

The following examples illustrate the DocumentInformation file 370 definition:

EXAMPLE 1

(The following example shows the DocumentInformation file 370 to open an existing document JupiterDocument.)

```
JupiterRules      JupiterDocument    ;
JupiterRules      -----> <DocumentRulesFile>
JupiterDocument   -----> DocumentName
;                 -----> End of statement
```

EXAMPLE 2

(This is an example which shows the DocumentInformation file 370 to create a new document EditableText.)

```
EditableTextRules EditableText TTextStationery
EditableTextLib;
EditableTextRules   -----> <DocumentRulesFile>
EditableText        -----> DocumentName
TTextStationery     -----> STATIONERY
EditableTextLib     -----> LIBRARY
;                   -----> End of statement
```

Random Reliability Engine Steps

Figure 5A:
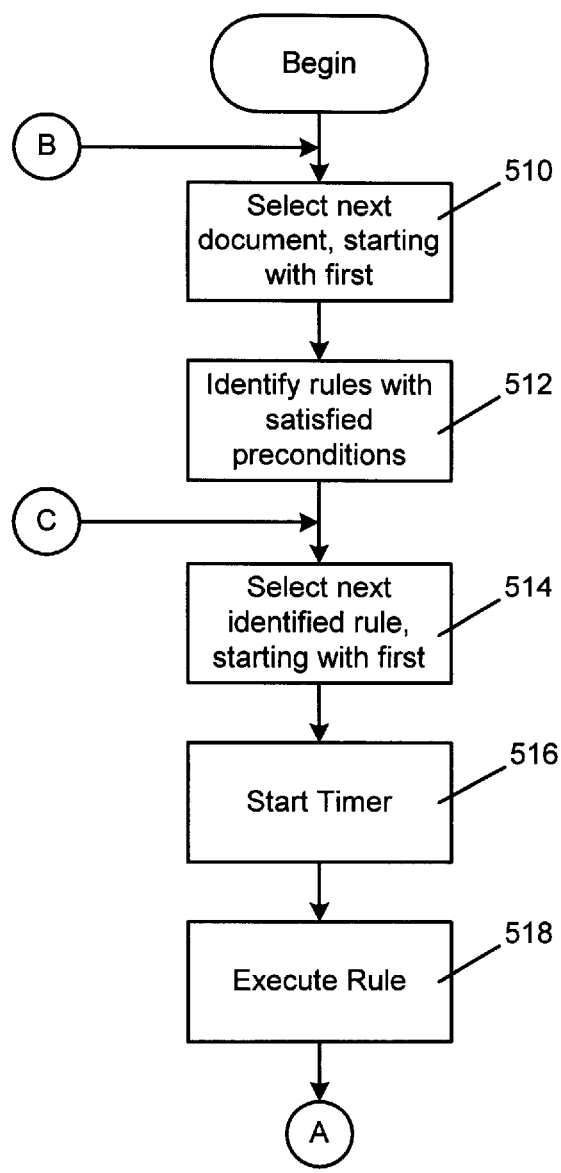
FIGS. 5A and 5B are flowcharts illustrating the steps performed by the random reliability engine.
Figure 5B:
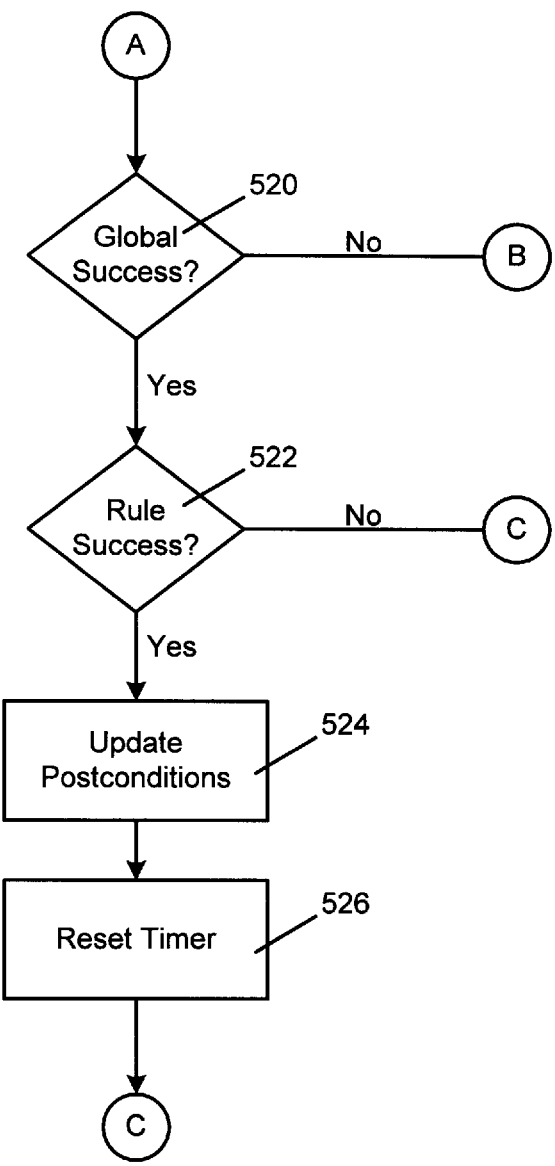

FIGS. 5A and 5B are flowcharts illustrating the steps performed by the random reliability engine 200. In step 510, the random reliability engine selects the next document in the document list 310. In step 512, the random reliability engine 200 identifies the rules in the document whose preconditions 334 are satisfied by the current conditions 320 of the distributed environment. In step 514, the random reliability engine 200 selects the next identified rule, starting with the first in the list of identified rules. In step 516, the random reliability engine 200 sets a timer to the duration 340 specified in the rule. In step 518, the random reliability engine 200 executes the selected rule. Step 520 is a decision step that determines whether there has been global success. Global success refers to the success of the system. If there has not been global success, then the random reliability engine 200 continues at step 510, selecting the next document. If there has been global success, the random reliability engine 200 continues at step 522. Step 522 is a decision step that determines whether there has been rule success. Rule success refers to the success of executing a particular rule. The success script associated with the rule is executed to determine whether there was rule success. If there has not been rule success, the random reliability engine 200 continues at step 514, selecting the next rule. If there has been rule success, the random reliability engine 200 continues at step 524. In step 524, the random reliability engine 200 updates the current conditions 320 based on the post-conditions 338. In step 526, the random reliability engine resets the timer.

The following is pseudocode for the random reliability engine:

```
      Builds DocumentList for random reliability engine DB
REDB
      Builds Initial ConditionsList L
      Builds Global ConditionsList G
      Builds Rules set for every document D
      Adds Common Rules set C to D
      set Engine-Time
      while ( Engine-Time is not expired ) {
      Select a document D randomly from REDB
      Get rules set of document D
      set document-time
      while ( document-time is not expired) {
      Collects rules S whose preconditions are
      satisfied by L and G
      selects a single rule R randomly from S
      set command execution time of R
      executes the action of R
      waits for command execution time of R to expire
      if { global failure } { abort the document
      break }
      check for the command success of R
      if { command success fail } {
      report fail to the log file
      Continue }
      else {
      if { post-conditions exists } {
      if { post-conditions } {
      this changes the condition list L
      } else {
      global post-conditions
      this changes the global condition list G
      }
      }
      }
      document-time   expired
      }
      execution complete.
```

Random Reliability Engine Execution

In one embodiment, the random reliability engine 200 is a GUI driver test script that runs random reliability tests. It is implemented using the GUI driver procedures defined in the file RandomUtilityFuncs. A test script writer invokes the random reliability engine 200 in a UNIX shell by typing "RandomEngine" followed by command line options.

Required Command Line Option:
-n(ew) <RandomEngineDatabase>
The RandomEngineDatabase parameter of the new command line option specifies the name of the file which has document information for each document 310 to be used in a new test.

The following is an example:

RandomEngine -new RandomEngineDatabase

Optional Command Line Options:
-v(ersion)
The version command line option displays the version of the program on one line and a single-line description of the program on the following line. The following is an example:

RandomEngine -v

-h(elp)
The help command line option displays a full usage message of the test program showing all the options available and what they do. The following is an example:

RandomEngine -h

-d(ebug)

The debug command line option runs the random reliability engine 200 under debugger. This option turns on the TRACE flag, thereby producing debuggable information on the screen device 112, 152, 182. The following is an example:

RandomEngine -new documentsfile -debug

-dir(ectory) <dir name>
The dir name parameter of the directory command line option specifies the name of the directory in which results are to be stored. If the directory command line option is not specified, results are stored under $Root/RandomResults/<BuildName>/R<timestamp>, where the BuildName parameter specifies the name of the build that is currently running test scripts and the R<timestamp> parameter specifies the date and time the test was started. The format of the R<timestamp> parameter is RyymmddHHMM where R stands for RandomEngine, yy stands for year, mm stands for month, dd stands for date, HH stands for hours, and MM stands for minutes. The following is an example:

RandomEngine -new DocumentsFile -dir ~/RandomEngine.results

-f(ile) <RandomRulesFile>
The RandomRulesFile parameter of the file command line option specifies the file in which the sequence of executed rules generated by the random reliability engine 200 are to be written. If the file command line option is not specified, then the rules are written into a default file under $Root/RandomResults/<BuildName>/R<timestamp>/RandomlyExecutedRules. The randomly generated rules can be played back with the script called PlayBackRules. The following is an example:

RandomEngine -new documentsfile -file ~/RandomRules

-min(imum) <number>
The number parameter of the minimum command line option specifies the minimum number of documents that can be open at any given time. The number parameter should be equal to or less than the number of documents in the document file and greater than or equal to one. If the minimum command line option is not specified, the default minimum number of documents is one. The following is an example:

RandomEngine -new documentsfile -min 2

-max(imum) <number>
The number parameter of the maximum command line option specifies the maximum number of documents that are open at any given time. The number parameter should be equal to or less than the number of documents in the document file and greater than or equal to one. The number parameter of the maximum command line option should never be less than the number parameter of the minimum command line option. If the maximum command line option is not specified, the default maximum number of documents is one. The following is an example:

RandomEngine -new documentsfile -max 2

-t(ime) <hours>
The hours parameter of the time command line option specifies the time during which the random reliability engine 200 should execute. If the time command line option is not specified, the default time is set to continuous hours.
-r(andom) <seed>

The seed parameter of the random command line option specifies the seed for the randomness of the test.

The test will assume the following runtime directory layout. The random reliability engine tools reside under $Root/Tests/RandomTools. Random engine scripts will reside under $Root/Tests/SystemTests/Reliability/ RandomTests/Scripts. Under the directory, Scripts are the DocumentRulesFiles for different documents.

The engine execution driver creates default directories to store the test result files if these directories are not specified by a user. The results are stored under the following directory: $Root/RandomResults/<buildname>/ <RyymmddHHMM>. There will be an individual directory for each build under directory RandomResults. For example, if the buildname parameter specifies cp1.1d10. The results will be under $Root/RandomResults/cp1.1d10.

Under each build, every time the test is executed, it is recorded under R<Timestamp>. This has the format R<yymmddHHMM>. Where R is RandomEngine, yy is year, mm is month, dd is date, HH is hours, and MM is minutes. For example, if the name of the results directory is R9509262035, then R stands for RandomEngine, 950926 is the date, and 2035 is the time the test was started.

The RandomEngine is dependent on the GUI driver, which is used to test GUI interface through a test script language.

The random reliability engine 200 uses the RandomUtilityFuncs file containing the rules that are commonly used in tests. The random reliability engine 200 also uses the RandomInitialization file that sets the environment variables and the RandomFormatCreator file which parses the DocumentInformation.

The RandomUtilityFuncs file is a GUI driver test script in the $Root/Tests/RandomTools directory. It has procedures that are used by the random reliability engine 200 and procedures that can be used by the DocumentRulesFile. The following are some procedures:

OpenDocument{ }

This procedure is used to open an existing document or to create a new document.

CloseDocument{ }

This procedure is used to close a document.

MoveDoc {XCoordinate YCoordinate}

This procedure moves the document within the bounds of the window.

ResizeDoc {GuiLabel XCoordinate YCoordinate}

This procedure resizes the document if it is within the bounds of the window. The GuiLabel parameter can be WResizeUL, WResizeLL, WResizeUR, and WResizeLR, where WResizeUL means upper left corner of the given document, WResizeLL means lower left corner of the given document, WResizeUR means upper right corner of the document, and WResizeLR means lower right corner of the given document. The procedure will resize the corner specified by the GuiLabel parameter to the new position specified by the coordinates in the XCoordinate and Ycoordinate parameters.

ActivateDocf{ }

This procedure activates a document based on the name of the document variable.

Menu{menuname submenu submenu1 . . . submenuN}

This procedure enables menu execution for the EditableText and GrafEdit documents.

Example 1: Menu Edit paste

Example 2: Menu "Character Styles" "Font" "Chicago"

Example 3: Menu Tools Rectangle

DropProxy{XCoordinate YCoordinate}

This procedure will drop its proxy randomly into one of the open documents. It will drop the proxy at the coordinates given by the XCoordinate and YCoordinate parameters in the randomly selected document.

ScrollDown{ }, ScrollUp{ }, ScrollRight{ }, ScrollLeft{ }

These procedures scroll in the appropriate direction in the current active document.

MarkRegion {XCoordinate YCoordinate X1Coordinate Y1Coordinate }

This procedure marks the selection for the coordinates given by the XCoordinate, YCoordinate, X1Coordinate, and Y1Coordinate parameters.

TearOffMenu{Submenu XCoordinate YCoordinate}

This procedure tears off the submenu specified in the Submenu parameter and places it at the coordinates specified by the XCoordinate and YCoordinate parameters.

WinZoom()

This procedure zooms the current active window.

WinMinimizer()

This procedure minimizes the current active window.

Buttons ()

This procedure enables clicking on a button, changing a button name, and changing a button width.

Textboxes()

This procedure enables going to a specified Textbox in the document, changing the size of the textbox, and entering text.

Sliders()

This procedure enables using a slider and changing its position.

The RandomInitialization file is a TCL script located in the $Root/Tests/RandomTools directory. It defines the environment variables and GUI driver variables that will be used in many of the procedures. The following are some examples of variables that are initialized:

RREgRootDir Designates the $Root/Tests directory.

RREgLogRoot Designates the $Root/RandomResults directory.

RREgLogDir Designates the $Root/RandomResults// <release-ID> directory.

RREgToolsDir Designates the directory for the Random tool scripts.

RREgDataDir Designates the directory for the DocumentRulesFile.

The RandomInitialization file also initializes and sets the default values for the movedelay, buttondelay, clickdelay, typing speed and gTolerance variables. It also initializes the RandomGenerator which is used by the random reliability engine 200 to determine a random number of documents to be used for a particular test.

The RandomFormatCreator file is a TCL script located in the $Root/Tests/RandomTools directory. It reads the random reliability engine DB 130 and stores information in the document list 310. The RandomFormatCreator file also reads from the DocumentRulesFile of each document in the document list 310 and formats it.

Moreover, the DocumentRulesFile for every document resides under $Root/Tests/SystemTests/Reliability/ RandomTests/Scripts. For the random reliability engine 200, the GUI driver test script resides under $Root/Tests/ RandomTools.

The GUI Driver

Overview

The present invention allows the creation of test scripts with a low learning barrier by providing tools that generalize current testing tools and knowledge. The distributed GUI driver is an extension of the existing GUI driver tool that allows for execution of TCL procedures at multiple computers. The distributed GUI driver includes six new commands that have been added in order to provide testing in a distributed environment. The test scripts that currently are written as "top level" programs need to be broken into procedures in order to work in a distributed test case.

The distributed GUI driver is a set of TCL extensions to the GUI driver tool, which executes GUI driver TCL scripts. This requires a GUI driver test script writer to place testing code into procedures in order to take advantage of this facility and to make use of modularizing techniques. Additionally, the procedure being evaluated is actually transported to the slave computers 148, 178. However, unlike remote procedure calls, the present invention does not require a programmer to write client and server procedures.

Frameworks provide distributed computing capabilities. The present invention allows the creation of test scripts that exercise distributed environments executing framework applications. By allowing test scripts to be distributed, the distributed GUI driver provides infrastructure for writing system level test scripts against the distributed environments. In addition, the distributed GUI driver is itself implemented using frameworks.

The remote execution facilities of the distributed GUI driver allow test scripts to involve multiple computers 108, 148, 178 and allows test scripts to execute simultaneously at these computers. Moreover, the distributed GUI driver allows the number of computers involved in such a test to be specified dynamically (i.e., not hard coded into a test script). One of the new commands in distributed GUI driver is a command that issues a query to a master DB server 210 that can be queried against a configuration database 218 to obtain multiple computers with specified configurations for a test. This provides a test script writer with a flexible and easy method for specifying the type of computers that are desirable for the test script being written.

The distributed GUT driver adds the ability for a master GUI driver 214 running on a master computer 108 to execute a procedure in a slave GUT driver 224 running on a slave computer 224, 234. Synchronous and asynchronous remote execution are provided.

When a procedure is evaluated asynchronously by remote execution, the master GUI driver 214 receives a promise procedure as the value of the remote execution. The master GUI driver's 214 test script can use the promise procedure to poll the slave GUT driver 224, 234 until the slave GUT driver 224, 234 returns a value. The distributed GUT driver does not provide synchronization primitives because they complicate the programming model and provide a less realistic situation for simulating interactive users. However, the distributed GUT driver test scripts can use a synchronous model of remote execution to ensure that operations occur in the correct order.

When the procedure is evaluated synchronously, the master GUT driver 214 waits until the procedure has executed on the slave computers 148, 178. The result of this appears to be a regular TCL procedure call. Most aspects of TCL procedure calling have been preserved. The remotely evaluated procedure returns its result to the master GUT driver's 214 TCL interpreter. The remotely evaluated procedure is able to access global variables from the master GUT driver 214 (these values are transported to the slave computer 148, 178), and is able to modify the values of these globals via the TCL upvar command (the globals are transported back to the master computer 108). For more information on the upvar command, see chapter 8 from John K. Ousterhout, *TCL and the Tk Toolkit*, Addison-Wesley, 1994, [hereinafter TCL and the Tk Toolkit], which is incorporated by reference herein.

The present invention also allows collection and analysis of test results. The distributed GUI driver provides commands to allow slave computers 148, 178 to report test results to the master computer 108. The test results are reported to the master computer 108 in the order in which they would appear if all the commands executed remotely at the slave computers 148, 178 had been executed locally at the master computer 108. In particular, the test results from these commands are timestamped so that they can be reassembled on the master computer 108 in correct temporal order.

GUI Driver Commands

The extensions to the distributed GUI driver are the following commands: remote query, remote leave, remote sync, remote async, remote global, remote upvar, remote echo, and remote echolog, which are described below.

The remote query command has the following form:

remote query n <A1><op1><k1> <A2><op2><k2> . . . <An><opi><kn>

The remote query command returns a TCL list containing the names of n computers from the master DB server 210 where attribute <Ai> has key value <ki>. The comparison of attribute <Ai> with key value <ki> is done using operator <opi>. If n computers cannot be found, a TCL language exception is raised. This exception can be caught using the TCL catch mechanism, as discussed further in chapter 12 of TCL and the Tk Toolkit. One of the computers is called a master computer 108, and each other computer is a slave computer 148, 178. All of the computers that are returned are marked as assigned to the test script initiated by the master computer 108. Multiple calls to the remote query command during the same test execution add computers to the list of computers assigned to the test script. This assignment allows multiple master GUI drivers 214 to execute and to draw from the same pool of free computers, while preventing them from trying to allocate the same computer to different test scripts.

Each attribute <Ai> may be a TCL string. The set of attributes is user extensible, but the values that attributes may take is restricted to TCL strings, numbers, and OS version numbers. Valid values for <opi> are <,>,>=,<=,==, !=. As a starting point, some attributes are predefined. The predefined attributes include:

MemorySize: denotes memory in 1 MB increments

SwapSpace: denotes swap space in 1 MB increments

TempSpace: denotes disk space free on/tmp or equivalent in 1 MB increments

OSVersion: operating system name {AIX,NT} followed by version number

CPVersion: build names (as given by $Root/SCM/ BuildName)

The following examples illustrate the use of the remote query command.

To get 5 AIX computers which are running the rootless window build, the following statement specifies the remote query command with the n computers parameter set to 5, the OSVersion parameter set to AIX4.1.3.0, and the CPVersion parameter set to cp1.ldl8.

```
if { [catch { set computers [ remote query 5
    OSVersion==AIX4.1.3.0
```

-continued

```
        CPVersion==cp1.ldl8 ] } ] } {
            . . . rest of test . . .
    } else {
        echo "couldn't get 5 computers with requested
            configuration"
    }
```

To get 8 computers with 32 MB of memory and at least 64 MB of swap space, the following statement specifies the remote query command with the n computers parameter set to 8, the MemorySize parameter set to 32 MB, and the Swapspace parameter set to be greater than or equal to 64 MB.

```
    if { [catch { set computers [ remote query 8
            MemorySize==32
            SwapSpace>=64 ] } ] } {
        . . . rest of test . . .
    } else {
        echo "couldn't get 8 computers with the specified
            configuration"
    }
```

The remote leave command has the following form:

remote leave <computername>

The remote leave command releases the specified master computer 108 from the test and returns it to the pool of free computers. The <computername> must have been obtained via the remote query command. All master computer names obtained via the remote query command must be released via the remote leave command.

The following example illustrates release of all of the computers retrieved by one of the two queries in the above examples:

```
        for each i $computers {
            remote leave $i
        }
```

The remote sync command has the following form:
   remote sync <computername> <procname> <a1> . . . <an>
The remote sync command executes TCL procedure <procname> on <computername> with arguments <a1> through <an>, using synchronous calling mode. Any variables which are global to the test script (i.e., appear in a global or upvar statement) will be transported to the slave computers 148, 178 unless they also appear in a remote global or remote upvar statement. The variables in the upvar statement will also be transported back to the master computer 108 and the new values will replace the old values. A TCL exception is signaled if there is a problem.

The following example causes "hello ted" to be printed on the screen device of a computer and returns "hello ted" as the result of the command. This is the primary mode of execution for distributed GUI driver test scripts.

```
        proc hello {name } {
            echo "Hello $name"
            return "Hello $name"
            remote sync peer.test.com hello ted
```

The remote async command has the following form:

remote async <computername> <procname> <a1> . . . <an>

The remote async command evaluates TCL procedure <procname> on <computername> with arguments <a1> through <an>, using asynchronous calling mode. Any variables which are global to the test script (i.e., appear in a global or upvar statement) are transported to the slave computers 148, 178 unless they also appear in a remote global or remote upvar statement. The variables in the upvar statement are transported back to the master computer 108, and the new values replace the old values. A TCL exception is signaled if there is a problem.

The result of a remote async command is the name of a promise procedure. The promise procedure will throw a TCL exception if the asynchronous procedure has not completed. Otherwise, the result of the promise procedure will be the result of the asynchronous procedure.

The following example illustrates the remote async command:

```
        proc longRunningProc { } {
            exec "sleep" 60
            return "Done"
        }
``` set promise [remote async test.com longRunningProc]

This sets the name of promise to the name of the promise procedure. The promise can be tested by executing the following:

catch {set result [eval $promise]}

If the value of the catch expression is zero, then result holds the result of the promise, and hence the asynchronous procedure execution. If the value of the catch expression is one, then the asynchronous procedure has not completed.

The following code loops until a promise is true:

```
        while { [catch {set result [eval $promise] } ] } {
            echo "polling for result"
        }
        echo $result
```

At most one promise can be outstanding for a particular computer. The remote async command is provided for situations which require high concurrency but loose coordination.

The following is an example of the remote async command:

```
        proc testProc { } {
            expensive test code
        }
        set promise [remote async test.com testProc ]
        while { [catch {set result [eval $promise] } ] } {
            do some other work
        }
        echo $result
```

The remote global command has the following form:

remote global <v1> . . . <vn>

The remote global command is placed in a TCL script that is evaluated remotely. It signals that the variables <v1> through <vn> are the global values on the destination (i.e., slave) computers 148, 178. That is, unlike variables declared in a global statement, the values of <v1> . . . <vn> will not be transported to the slave computers 148, 178. This allows a programmer to access global variables on the slave computers 148, 178. If this command is executed locally, it behaves the same as the TCL global command. The following is an Example of the remote global command:

```
proc masterAutoPath { } {
    global auto_path
    return $auto_path
}
``` remote sync peer.test.com masterAutoPath (This returns the value of the global variable auto_path on the computer executing the remote sync command.)

```
proc slaveAutoPath { } {
    remote global auto_path
    return $auto_path
}
``` remote sync peer.test.com slaveAutoPath (This returns the value of the global variable auto_path as defined on peer.test.com.)

The remote upvar command has the following form:

remote upvar <globalname> <localname>

The remote upvar command indicates that <localName> is an alias for the global variable <globalName>, and that the procedure containing this command will modify the value of <globalname> by reference. In order to preserve the modified global variable, <globalName> is copied to the slave computers,148, 178 before the procedure is executed and copied back from the slave computers 148, 178 after the procedure has executed. This command is included for consistency with the TCL global variable model.

The remote echo command has the following form:

remote echo<message text>

The remote echo command echoes the <message text> back to the master GUI driver 214, where it is stored for later retrieval by the remote echolog command, discussed below. A TCL exception is signaled if there is a problem.

The following is an example of the remote echo command:

remote echo "This message will be collected on the master computer"

The remote echolog command has the following form:

remote echolog

The remote echolog command returns all of the messages produced by the remote echo command in all slave GUI drivers 224, 234 for this test. This command returns a TCL string, with the message text for each procedure grouped together. The text is ordered according to the time when remote execution was requested (as opposed to the time remote execution was completed). A TCL exception is signaled if there is a problem. Currently, all remote commands run in a single GUI driver session on the slave computers 148, 178. The remote echolog command returns all the messages produced during that session.

The following is an example of the remote echolog command:

set output [remote echolog] echo "The full output is $output"

Architecture

To run a test script using the distributed GUI driver, each of the computers participating must be able to share applications. In addition, one master computer 108 must be designated as the master DB server 210 for maintaining configuration information. This is accomplished by running the DesignateComputerDB command. The user initiating the test starts a master GUI driver by typing "MasterGUI driver". The user is then presented with a GUI driver interpreter which can be used to execute a random reliability engine. Currently, the only part of the distributed GUI driver toolset that is user visible is the master GUI driver interpreter, with its extensions to TCL.

Test scripts involving only TCL or GUI driver commands are portable. The word "remote" is currently reserved as a TCL function name. Test scripts which interact with the master operating system or file system may be non-portable. The distributed GUI driver test scripts are portable across AIX and NT operating systems.

The distributed GUI driver architecture is composed of the components shown in FIG. 2. Each slave computer 148, 178 has a slave GUI driver 224, 234 that runs a configuration server 220, 230, which collects information about that computer's configuration. The configuration server 220, 230 reports this information to a master DB server 210. The master DB server 210 stores this information in a database.

The remote query command connects to the configuration DB 218 in order to find computers that have the desired configuration. This list of computers is then assigned to the test. The master GUI driver 214 uses the remote object call services to connect to the appropriate slave GUI driver 224, 234.

Class Specifications

The master DB server 210, the master GUI driver 214, the configuration server 220, 230, and the slave GUI driver 224, 234 are each specified as classes. Their class structures are described below:

Master DB server

The master DB server 210 includes the following methods: Register, GetConfiguration, Unregister, Leave, Query, Assignments, and Computers. This is a straightforward use of the Remote Object Call framework. Concurrent access to the database is mediated. An instance of TComputerDB-Caller is to be created by clients of the master DB server 210.

The Register method is used by the configuration server 220, 230 to register the addition of a new computer. The Register method calls the GetConfiguration method to load configuration information for the master computer 108 that has been registered.

The Unregister method is called to remove a computer from the configuration DB 218. The configuration server 220, 230 calls this method when it is shut down.

The Query method is called via the remote query command from TCL. It allows the configuration DB 218 to be queried for computers matching a set of criteria. The Query method makes use of the deprecated TProperty API in an internal fashion. This allows translating the flexible queries allowed by remote query into queries understood by the Query method. The computers returned by Query are assigned to the test that is initiated by the master computer 108 calling the Query method. If a test assignment has already been established for a master computer 108 via a previous call to the Query method, then the computers returned by subsequent calls to the Query method from that master computer 108 will be appended to that test assignment.

The Leave method is called via the TCL remote leave command. It signals that its argument is to be removed from whatever test it was assigned to and returned to the pool of free computers. When the last computer is removed from a test assignment, the test assignment is deleted.

The Assignments method returns a list of computers and a TSequenceOf the computers assigned to the test originating at that computer.

The Computers method returns a TSequenceOf all the computers in the configuration DB 218.

The master DB server 210 is instantiated with an instance of TComputerDBCaller. In order to do this, the programmer first queries the Network Directory to find the current master DB server 210.

Master GUI driver

The master GUI driver is a wrapper around a TTCLEvaluator. This TTCLEvaluator includes a TCL-AppInit that incorporates GUI driver support and includes a new TCL command which implements the remote command extensions. After TCL_AppInit has been called, the main method adds the new remote command and then begins interactive command processing.

The implementation of the remote commands in the master GUI driver instantiates an instance of TDGUI driverCaller for each computer that it wishes to talk to.

In its current implementation, DGUI driver returns all the echoed text from a remotely executed procedure at the time the procedure returns (or its promise yields the answer). This text is not logged to a file or otherwise checkpointed.

Configuration Server

The configuration server 220, 230 includes the following methods: GetRamSize, GetRootSpace, GetTempSpace, GetPagingSpace, and GetOSVersion. This is a straightforward application of the Caller/Dispatcher/Implementation Remote Object Call services framework. TConfigurationImplementation works by creating shell commands for AIX configuration information utilities. These commands are executed and the results are parsed back into C++ data types.

To use the configuration server 220, 230, a programmer instantiates an instance of TConfigurationCaller. The programmer first creates a network service reference in order to do this. When the configuration server 220, 230 starts up, it uses the Network Directory to locate the master DB server 210. It then reports it's name to the master DB serves 210. The master DB server 210 then queries the calling configuration server 220, 230 to get configuration information. When the configuration server 220, 230 shuts down, it notifies the master DB server 210 that its computer is to be unregistered. The methods of the configuration server 220, 230 return individual pieces of configuration information.

Slave GUI Driver

The slave GUI driver 224, 234 includes the following methods: ExecuteSynchronousProcedure, ExecuteAsynchronousProcedure, and ExecutePromiseProcedure. This is another straightforward application of the Remote Object Call Services framework. TDGUI driverImplementation is a wrapper around TTCLEvaluatorThread, which allows the TCL/GUI driver interpreter to run asynchronously. The TTCLEvaluatorThread is in turn a wrapper around a TTCLEvaluator whose TCL_AppInit augments it with GUI driver functionality.

The SynchronousProcedureExecute method implements synchronous remote procedure execution, including global variable processing. This method relies on some TCL glue to be executed in order to put the TCL script in the right format.

The AsynchronousProcedureExecute method implements synchronous remote procedure execution, including global variable processing. This method relies on some TCL glue to be executed in order to put the TCL script in the right format.

The PromiseProcedureExecute method implements the promise procedures returned when a procedure is execute asynchronously.

All components depend on Remote Object Call framework and the Portable Object Directory Server Autostart. In addition, the configuration DB 218 depends on Streamed Object Storage System and Network Directory. The configuration server depends on the Network Directory. DGUI driver depends TCLEvaluator and GUI driver.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the intention be limited not by this detailed description, but rather by the claims appended hereto.

We claim:

1. An object oriented programming (OOP) based random reliability testing method for testing the reliability of a plurality of computers in a distributed computer environment, the method comprising the steps of:

identifying a current state of each of the computers in the distributed computer environment;

iteratively selecting one or more random rules whose associated preconditions are satisfied based on the identified current state from a memory of one of the computers, each random rule identifying one or more actions to be performed by each of the computers in the distributed computer environment; and under control of each of the computers in the distributed computer environment, executing each selected random rule in a memory of that computer;

determining whether each selected random rule executed successfully, after waiting a predetermined amount of time, so that reliability of the distributed computer environment is analyzed; and for each random rule that is determined to have executed successfully, updating the identified current state based on post-conditions associated with that random rule.

2. The method of claim 1, wherein each of the random rules is provided in a document in the memory of one of the computers.

3. The method of claim 1 wherein at least one action identified in a random rule is mapped to a user interface command.

4. The method of claim 1 wherein each random rule comprises a graphical user interface (GUI) script.

5. The method of claim 4 wherein the distributed computer environment is comprised of a master computer and a slave computer, and the step of executing each selected random rule further comprises the step of executing the GUI script of each selected random rule simultaneously at the master computer and the slave computer.

6. The method of claim 5 wherein the master computer is a master configuration server for maintaining a database in the memory coupled to that computer for containing configuration information about each of the computers in the distributed computer environment.

7. The method of claim 6 wherein the master configuration server comprises a master configuration class which has data members and member functions related to maintaining a database in the memory coupled to that computer for containing configuration information about each of the computers in the distributed computer environment.

8. The method of claim 5 wherein the master computer has a master GUI driver for performing the step of executing the GUI script for each selected random rule at the master computer and for instructing the slave computer to perform the step of executing the GUI script for each selected random rule at the slave computer.

9. The method of claim 8 wherein the master GUI driver comprises a master GUI driver class which has data members and member functions related to performing the step of executing the GUI script for each selected random rule at the master computer and for instructing the slave computer to perform the step of executing the GUI script for each selected random rule at the slave computer.

10. The method of claim 5 wherein the slave computer is a slave configuration server for forwarding configuration information, from the memory coupled to that computer, about the slave computer to the master computer.

11. The method of claim 10 wherein the slave configuration server comprises a server configuration class which has data members and member functions related to forwarding configuration information, from the memory coupled to that computer, about the slave computer to the master computer.

12. The method of claim 5 wherein the slave computer has a slave GUI driver for performing the step of executing the GUI script for each selected random rule at the slave computer.

13. The method of claim 12 wherein the slave GUI driver performs the step of forwarding execution result information to the master GUI driver, after performing the step of executing the GUI script for each selected random rule.

14. The method of claim 12 wherein the slave GUI driver comprises a slave GUI driver class which has data members and member functions related to performing the step of executing the GUI script for each selected random rule at the slave computer.

15. An object oriented computer programming apparatus comprising:
a plurality of computers in a distributed computer environment;
means, performed by one of the computers, for identifying a current state of each of the computers in the distributed computer environment;
means, performed by one of the computers, for iteratively selecting one or more random rules whose associated preconditions are satisfied based on the identified current state from a memory of one of the computers, each random rule identifying one or more actions to be performed by each of the computers in the distributed computer environment; and
means, performed by each of the computers,
for executing each selected random rule in a memory of that computer;
for determining whether each selected random rule executed successfully, after waiting a predetermined amount of time, so that reliability of the distributed computer environment is analyzed; and
for each random rule that is determined to have executed successfully, for updating the identified current state based on post-conditions associated with that random rule.

16. The apparatus of claim 15 wherein the distributed computer environment is comprised of a master computer and a slave computer, and the means for executing each selected random rule further comprise means for executing each selected random rule simultaneously at the master computer and the slave computer.

17. The apparatus of claim 16, wherein the master computer is a master configuration server for maintaining a database in the memory coupled to that computer for containing configuration information about each of the computers in the distributed computer environment.

18. The apparatus of claim 17, wherein the master configuration server comprises a master configuration class which has data members and member functions related to maintaining a database in the memory coupled to that computer for containing configuration information about each of the computers in the distributed computer environment.

19. The apparatus of claim 18, wherein the master computer has a master GUI driver with means for executing a GUI script for each selected random rule at the master computer and for instructing the slave computer to execute the GUI script for each selected random rule at the slave computer.

20. The apparatus of claim 19, wherein the master GUT driver comprises a master GUI driver class which has data members and member functions related to executing the GUI script for each selected random rule at the master computer and for instructing the slave computer to execute the GUI script for each selected random rule at the slave computer.

21. The apparatus of claim 16, wherein the slave computer is a slave configuration server for forwarding configuration information, from the memory coupled to that computer, about the slave computer to the master computer.

22. The apparatus of claim 21, wherein the slave configuration server comprises a server configuration class which has data members and member functions related to forwarding configuration information, from the memory coupled to that computer, about the slave computer to the master computer.

23. The apparatus of claim 16, wherein the slave computer has a slave GUI driver for executing a GUI script for each selected random rule at the slave computer.

24. The apparatus of claim 23, wherein the slave GUI driver forwards execution result information to a master GUI driver, after executing the GUI script for each selected random rule.

25. The apparatus of claim 23, wherein the slave GUI driver comprises a slave GUI driver class which has data members and member functions related to executing the GUI script for each selected random rule at the slave computer.

26. The apparatus of claim 15, wherein each of the random rules is provided in a document in the memory of one of the computers.

27. The apparatus of claim 15, wherein at least one action identified in a random rule is mapped to a user interface command.

28. The apparatus of claim 15, wherein each random rule comprises a graphical user interface (GUI) script.

29. A program storage device, readable by a computer, tangibly embodying one or more programs of instructions executable by the computer to perform method steps of an object oriented programming (OOP) based random reliability testing method for testing the reliability of a plurality of computers in a distributed computer environment, the computer having a memory coupled thereto for storing the program, the method comprising the steps of:

identifying a current state of each of the computers in the distributed computer environment;

iteratively selecting one or more random rules whose associated preconditions are satisfied based on the identified current state from a memory of one of the computers, each random rule identifying one or more actions to be performed by each of the computers in the distributed computer environment; and under control of each of the computers in the distributed computer environment, executing each selected random rule in a memory of that computer;

determining whether each selected random rule executed successfully, after waiting a predetermined amount of time, so that reliability of the distributed computer environment is analyzed; and for each random rule that is determined to have executed successfully, updating the identified current state based on post-conditions associated with that random rule.

30. The program storage device of claim 29 wherein the distributed computer environment is comprised of a master computer and a slave computer, and the step of executing each selected random rule further comprises the step of executing each selected random rule simultaneously at the master computer and the slave computer.

31. The program storage device of claim 30, wherein the master computer is a master configuration server for maintaining a database in the memory coupled to that computer for containing configuration information about each of the computers in the distributed computer environment.

32. The program storage device of claim 31, wherein the master configuration server comprises a master configuration class which has data members and member functions related to maintaining a database in the memory coupled to that computer for containing configuration information about each of the computers in the distributed computer environment.

33. The program storage device of claim 32, wherein the master computer has a master GUI driver for performing the step of executing a GUI script for each selected random rule at the master computer and for instructing the slave computer to perform the step of executing the GUI script for each selected random rule at the slave computer.

34. The program storage device of claim 33, wherein the master GUI driver comprises a master GUI driver class which has data members and member functions related to performing the step of executing a GUI script for each selected random rule at the master computer and for instructing the slave computer to perform the step of executing the GUI script for each selected random rule at the slave computer.

35. The program storage device of claim 30, wherein the slave computer is a slave configuration server for forwarding configuration information, from the memory coupled to that computer, about the slave computer to the master computer.

36. The program storage device of claim 35, wherein the slave configuration server comprises a server configuration class which has data members and member functions related to forwarding configuration information, from the memory coupled to that computer, about the slave computer to the master computer.

37. The program storage device of claim 36, wherein the slave GUI driver performs the step of forwarding execution result information to a master GUI driver, after performing the step of executing the GUI script for each selected random rule.

38. The program storage device of claim 36, wherein the slave GUI driver comprises a slave GUI driver class which has data members and member functions related to performing the step of executing the GUI script for each selected random rule at the slave computer.

39. The program storage device of claim 35, wherein the slave computer has a slave GUI driver for performing the step of executing a GUI script for each selected random rule at the slave computer.

40. The program storage device of claim 29, wherein each of the random rules is provided in a document in the memory of one of the computers.

41. The program storage device of claim 29, wherein at least one action identified in a random rule is mapped to a user interface command.

42. The program storage device of claim 29, wherein each random rule comprises a graphical user interface (GUI) script.

* * * * *

UNITED STATES PATENT AND TRADEMARK OFFICE
CERTIFICATE OF CORRECTION

PATENT NO. : 5,881,219
DATED : March 9, 1999
INVENTOR(S) : Theodore Wei-Yun Leung and Shoba Raj It is certified that error appears in the above-identified patent and that said Letters Patent is hereby corrected as shown below:

Column 22, Line 25, delete "GUT" and replace with --GUI--

Signed and Sealed this

Twenty-eighth Day of March, 2000

Attest:

Q. TODD DICKINSON

Attesting Officer

Commissioner of Patents and Trademarks